Figure 1:
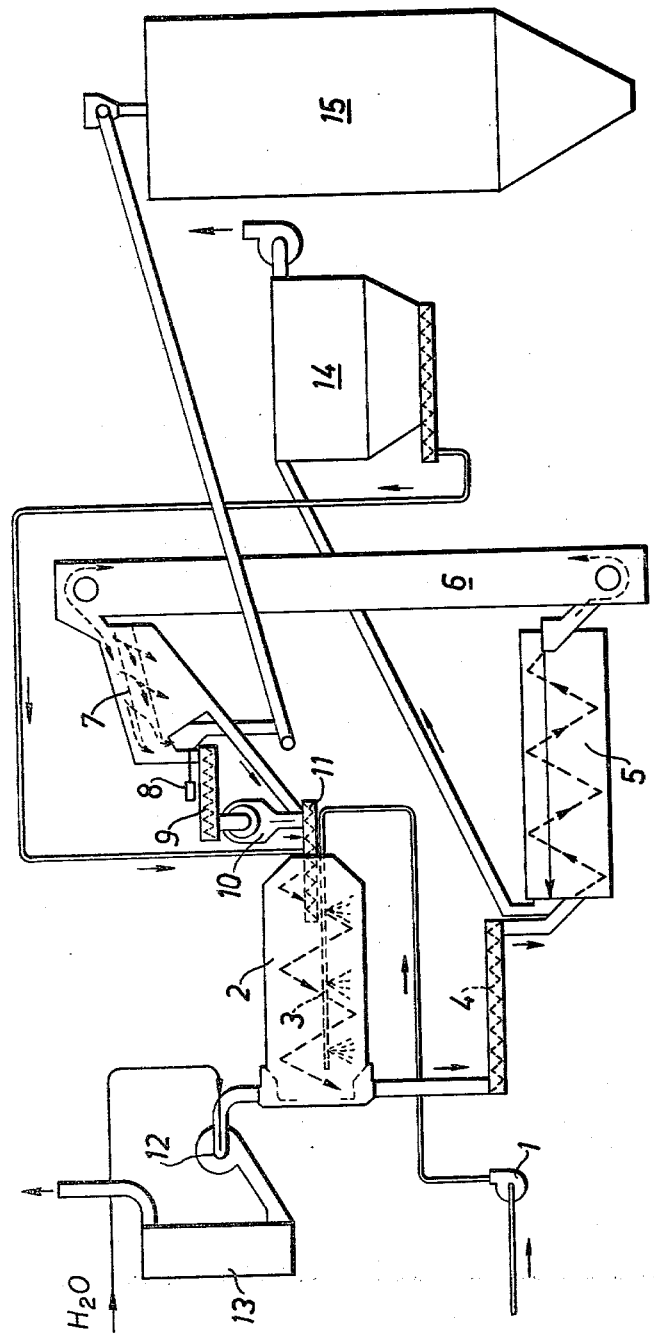

United States Patent [19]

Boisen Schmidt et al.

[11] 4,276,052
[45] Jun. 30, 1981

[54] METHOD OF CRYSTALLIZING ALUMINIUM SULPHATE SOLUTIONS TO FORM DUST-FREE GRANULES HAVING UNIFORM GRAIN SIZE

[75] Inventors: Egon Boisen Schmidt, Ekeby; Josef K. S. Zechner; Gösta M. Frang, both of Helsingborg, all of Sweden

[73] Assignee: Boliden Aktiebolag, Stockholm, Sweden

[21] Appl. No.: 21,205

[22] Filed: Mar. 16, 1979

Related U.S. Application Data

[63] Continuation of Ser. No. 803,455, Jun. 6, 1977, abandoned.

[30] Foreign Application Priority Data

Jun. 10, 1976 [SE] Sweden .............................. 7606601

[51] Int. Cl.³ .............................................. B01D 9/02
[52] U.S. Cl. ..................................... 23/301; 23/305 A
[58] Field of Search ................. 23/301, 305 A, 313 R; 423/556; 427/215

[56] References Cited

U.S. PATENT DOCUMENTS

| | | | |
|---|---|---|---|
| 2,340,567 | 2/1944 | Sargent | 23/305 A |
| 2,895,813 | 7/1959 | Brooksbank et al. | 23/305 A |
| 3,011,878 | 12/1961 | Lackey et al. | 23/293 R |
| 3,082,064 | 3/1963 | Brooksbank | 423/556 |
| 3,141,743 | 7/1964 | Marsh | 23/305 A |
| 3,143,392 | 8/1964 | Saeman | 23/305 A |

FOREIGN PATENT DOCUMENTS

| | | |
|---|---|---|
| 210115 | 9/1957 | Australia . |
| 574471 | 4/1959 | Canada . |
| 574472 | 4/1959 | Canada . |
| 2400553 | 7/1974 | Fed. Rep. of Germany . |
| 2142647 | 2/1973 | France . |
| 514149 | 10/1939 | United Kingdom . |
| 576557 | 4/1946 | United Kingdom . |
| 796856 | 6/1958 | United Kingdom . |
| 812265 | 4/1959 | United Kingdom . |

OTHER PUBLICATIONS

J. Am. Chem. Soc. (1954), 2057, Smith et al.

*Primary Examiner*—Hiram Bernstein
*Attorney, Agent, or Firm*—Gordon W. Hueschen

[57] ABSTRACT

A method of crystallizing a solution of aluminium sulphate to form crystal agglomerates having an essentially uniform grain size and being in the form of granules having a characteristic appearance and good storage properties. A solution having a temperature of 105°–115° C. and a concentration of 14.5–16.8% by weight of $Al_2O_3$ is brought to crystallize onto a bed of crystalline aluminium sulphate in a drum, the length of which is considerably larger than the diameter, a temperature of 70°–95° C. being maintained in the bed. Part of the crystalline product discharged from the drum is ground and recycled to the drum in an amount of 40–200 percent by weight of added solution and air is passed through the drum to remove moisture evolved by the crystallization so as to form a final product with more than 75% by weight present in the crystalline state and containing 15.0–18.0% by weight of $Al_2O_3$.

12 Claims, 2 Drawing Figures

METHOD OF CRYSTALLIZING ALUMINIUM SULPHATE SOLUTIONS TO FORM DUST-FREE GRANULES HAVING UNIFORM GRAIN SIZE

This application is a continuation of application Ser. No. 803,455, filed June 6, 1977, now abandoned.

The present invention relates to a method of crystallizing a solution of aluminium sulphate to the formation of crystals and crystal agglomerates having an essentially uniform grain size and a characteristic appearance.

PRIOR ART

It is known to convert a concentrated solution of aluminium sulphate to the shape of granules by directing an aluminium sulphate solution onto a bed of solid particles in a rotating drum. A method of this type is disclosed for instance in the Australian Patent Specification No. 210,115. In this method the concentrated solution is sprayed, in a state of fine division, onto the bed. The major part of the solution solidifies on the surface of the solid particles, while part of the applied solution forms new particles, which then increase in size when new solution is applied onto their surfaces. Another method is disclosed in U.S. Pat. No. 2,340,567, according to which crystalline product having an $Al_2O_3$ content above 20% is obtained from solutions containing maximally 14% of $Al_2O_3$. The same process appears in the British Patent Specification No. 576,557 and also here it is related to the making of solid products with high content of $Al_2O_3$ by combined evaporation-crystallization of weaker solutions of aluminium sulphate containing less than 14% $Al_2O_3$.

In accordance with these known methods, it is not possible to directly prepare an aluminium sulphate that fulfills the commercial standard requirements, but the product has to be post-treated, optionally calcined, dried and/or ground. This is obviously a consequence of the fact that the two last mentioned processes are based on the British Patent Specification No. 514,149, which describes the production of anhydrous aluminium sulphate.

PRESENT INVENTION

According to the present invention it has turned out to be possible to avoid the above mentioned drawbacks and limitations, and to obtain a product which has a particle size that is variable within wide limits and that is essentially uniform and which product has a characteristic appearance and which is in the crystalline state to more than 75%, by applying an aluminium sulphate solution having a temperature of 105°–115° C. and a concentration of 14.5–16.8% of $Al_2O_3$ onto a bed of final product in a rotating drum, the length of which is considerably larger than the diameter thereof, the formed crystalline product preferably being discharged from the drum at such rate that the residence time in the drum will be at least five (5) minutes, especially at least ten (10) minutes.

A part of the crystallized product discharged from the drum is ground and recycled, as seed material, to the drum in an amount that is preferably 40–200 percent by weight of the charged solution, and a controlled amount of air is passed through the drum to regulate the temperature and to remove moisture, whereby a temperature of 70°–95° C. is maintained in the bed and the final discharge product contains a percent by weight of $Al_2O_3$ which is 0.4–1.5% higher than that of the feed solution, i.e. about 15–18%. The crystallization is stopped by suitable cooling. If a rotating drum is used, a dust-free product of uniform grain size can be obtained from it.

As already mentioned, the rotating drum, wherein the crystallization takes place, should have a length that is essentially larger than the diameter thereof. Preferably, the ratio between length and diameter is at least about two (2).

The concentration of the aluminium sulphate solution should correspond to a content of $Al_2O_3$ of 14.5–16.8% by weight. A higher concentration and unfavourable crystallization conditions connected with that will give a product the content of amorphous matter of which is too high. Furthermore, the solution will be difficult to handle, due to the fact that it has a tendency to be viscous and to solidify in these parts of the apparatus that it passes before getting in contact with the crystallization promoting material in the drum. If the concentration of the solution is too low, a damp and sticky product is obtained, which causes process difficulties. In accordance with the invention a more concentrated aluminium sulphate solution than 16.8% can be applied to the bed of the final product, if at the same time, water or steam is added separately.

Aluminium sulphate of technical grade often contains varying amounts of iron, depending on the kind of raw material used, and may sometimes also contain certain amounts of water insoluble impurities. Also in these cases it has been shown that the crystallization method can be advantageously applied to the above mentioned $Al_2O_3$ content of the feed solution and of the recovered product, respectively, however, having to be adjusted downwards with reference to the impurities present in such a way, that water available in the solution, will be enough to enable the aluminium sulphate of the discharged product to be obtained in the crystalline state to more than 75%.

The temperature of the solution must be so high that solidification will not take place in earlier parts of the equipment, and the solution will not solidify before it gets into contact with the bed material and the temperature is 105°–115° C. The solution can be applied to the bed in the rotating drum in any desired way, provided that it is distributed over the length of the drum in a fairly homogenous way.

An atomization of the solution is not necessary. The solution is distributed on the surface of the seed material by means of the vigorous movement of the bed obtained by the rotation. The feed zone for the solution may well extend over the whole length of the drum but preferably it extends at the most over 95% of the length of the drum. In the last part of the drum, adjacent to the discharge opening, no solution ought to be added, but the crystallization should be completed within this zone.

An essential feature of the method according to the invention is that seed material is continuously added to the bed, consisting of seed material. A seed material part of the product discharged from the drum is preferably utilized, the amount of added seed material should preferably be 40–200 percent by weight of the added solution. Even if the grain size of the product discharged from the drum is essentially uniform there are minor amounts of crystal agglomerates present having sizes below as well as above the desired grain size of the final product and these are preferably utilized as seed material. The small crystals may be added directly to the drum, while the large crystal agglomerates firstly have to be crushed to a grain size below that of the desired grain size of the final product.

In the continuous operation the temperature of the bed is 70°-95° C. To avoid operating difficulties the temperatures may be allowed to drop below 70° C. or to rise above 90° C. for short periods of time only. The temperature of the bed is dependent on the amount and the temperature of the feed solution and the seed material as well as on the amount of air passed through the drum.

As mentioned above the temperature of the solution is to be 110°-115° C., and a preferable temperature of the seed material has been shown to be 25°-60° C. The coolings used are essentially of two kinds, cooling by means of water evaporation and cooling by means of the outer wall of the drum. The air passed through the drum has a relatively poor cooling effect and, in view of this, the air temperature is not especially critical. It should be 0°-50° C., but may be allowed to rise to 80° C. The major effect of the air is to absorb and remove the steam formed.

It has been found desirable to expose the outer wall of the drum to mild cooling, namely the cooling exerted by the surrounding air on the non-isolated drum wall. Through this cooling the internal wall of the drum will be imparted a temperature that is below the dew point of the damp air in the drum. Consequently water will condense on the internal wall of the drum, which results in a not too strong attachment of the material to the drum wall or in a desired thin deposition on the internal wall. The drum is preferably equipped with internal scraping means which tend to keep the drum wall clean or prevent the deposition on the drum wall from being too thick. A thin deposition on the internal wall of the drum involves an equalizing effect, which means that the drum barrel need not be completely circular.

The rotational speed of the drum should be as high as possible without the material being conveyed around the drum, preferably above 40 percent of the critical speed at which the material is conveyed around the drum.

By the method according to the invention the crystalline product is obtained in a characteristic shape which is characterized by essentially spherical crystal agglomerates which often have warty projections on the surface. By adjustment of temperature, amount of solution, amount of air, material and mesh size of the sieve, the process is controlled so as to obtain the desired grain size. This can be varied from for instance 0.5-1.5 mm to for instance 20-25 mm.

The crystal mass is conveyed from the crystallization drum, preferably by means of an open screw conveyor, to an aircooled cooling drum. The purpose of the screw conveyor is to prevent, by means of the mixing effect, an aggregation of the crystals caused by a slight post-crystallization and high steam pressure over hot aluminium sulphate. A protective grating covers the screw conveyor as a protection against accident but allows evaporation of steam.

In order to stop the crystallization and to obtain a product having high shelf life, the crystals are cooled to a temperature of at maximum 60° C. If the product is to be stored under pressure, for instance in a silo, cooling is to be made to a temperature not exceeding 45° C. The lifting system of the rotating cooling drum has been designed in such a way and the rotational speed, the degree of filling, and the velocity of the air through the drum, have been determined so as to achieve a high cooling effect, to have a very slight grinding of the granules and to obtain a dust-free product.

Figure 2:
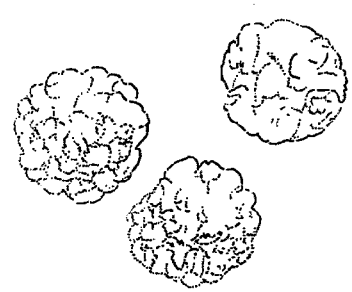
Figure 2:
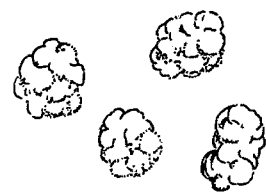
Figure 2:
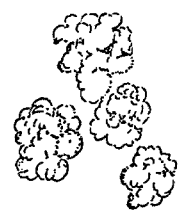

The invention will now be explained further with reference to the accompanying drawing, wherein FIG. 1 shows a plant for the manufacture of crystallized aluminium sulphate in accordance with the technique according to the invention, and FIG. 2 shows the characteristic appearance of crystal agglomerates prepared in accordance with the invention.

An aluminium sulphate solution of the desired concentration is pumped by means of a pump 1 to a pipe 3, which extends into a horizontal, rotating drum 2 and which is provided with openings for the distribution of the solutions over the bed of aluminium sulphate in the crystalline state, which bed is present in the drum. The drum 2 has a length that is considerably larger than the diameter. The obtained material is discharged from the drum 2 via a screw conveyor 4 to a rotating cooling drum 5 and further through an elevator 6 to a sieve 7 containing two exchangeable screens.

The product obtained from the sieve, which has smaller grain size than the desired final product, is recycled to the crystallization drum by means of conveyor 11. The product obtained from the sieve which has a larger grain size than the desired product and in addition to that the amount of final product which is required to obtain the desired quantity of seed material are passed via a conveyor 9 to a mill 10. In this mill the product is ground so as to obtain a material having a grain size below that desired for the final product. The ground material is recycled, as seed material, to the crystallization drum by means of a conveyor 11 that is designed in such a way so as to enable the material to be brought varyingly far into the drum. The final product is passed to a bin 15, from which it in a manner known is disposed of either for bulk delivery or for bagging. In the cooling drum 5, the material is cooled by means of air, which is then purified in a dust filter 14. Separated dust is recycled to the crystallization drum 2. The air from this drum is by fan 12 brought to and purified in a gas scrubber 13.

The invention will be further illustrated below by means of non-limiting examples. In these the percentage relates to weight unless otherwise indicated.

EXAMPLE 1

In a plant of the kind shown in FIG. 1 the crystallization drum had a length of 4.8 meters and a diameter of 2.2 meters and was rotating with a speed of 13 rpm. An aluminium sulphate solution having a concentration of 16.2% by weight of $Al_2O_3$ and a temperature of 112° C. was passed to the crystallization drum in an amount of 7000 kilos/h through a pipe having three openings, the first of which was located 0.3 meter from the inlet opening of the drum and the last one of which was located 1 meter from the outlet of the drum. Air having a temperature of 20° C. and in an amount of 4,700 $Nm^3/h$ was passed through the drum. In the bed a temperature of 80° C. was maintained. The average residence time of the material in the drum was 15 minutes. In the drum there was also continuously added a seed material in a quantity of 5,700 kilos/h which material had a temperature of 40° C. From the drum a material amount of about 12,000 kilos/h was discharged. In the sieve the coarse screen had a mesh size of 2 millimeters and the coarse fraction which did not pass through the said screen amounted to about 1,800 kilos/h.

This fraction was ground in the mill to a grain size of 100% less than 1.5 millimeters. The fine screen had a mesh size of 0.50 millimeter and the fine fraction which passed through the said screen to about 100 kilos/h. These two fractions were recycled to the crystallization drum. In order to obtain the desired quantity of seed material, 5,700 kilos/h, also a part of the fraction 0.5–2 millimeters was recycled through the mill to the crystallization drum, namely a quantity of about 3,800 kilos/h. The remainder of the fraction 0.5–2 millimeters was passed as the final product to silo 15. This quantity was about 6,500 kilos/h and had a content of $Al_2O_3$ of 17.1%.

EXAMPLE 2

In a plant of the same kind as in Example 1 the drum was imparted a rotational speed of 13 rpm. An aluminium sulphate solution having a concentration of 15.8 % by weight of $Al_2O_3$ and a temperature of 110° C. was added to the crystallization drum in a quantity of about 6,500 kilos/h by the same type of means as in Example 1. Air of 20° C. and in a quantity of about 5,500 $Nm^3/h$ was passed through the drum. In the bed a temperature of 75° C. was maintained. To the drum there was continuously added an amount of seed material of about 3,000 kilos/h which material had a grain size of 100% less than 10 millimeters and a temperature of 40° C.

In the sieve having 2 screens the coarse screen had a mesh size of 20 millimeters and the fine screen had a mesh of 10 millimeters. The amount which did not pass through the coarse screen was about 500 kilos/h and was passed to the grinding operation, and the one which passed through the fine screen was about 1,500 kilos/h. These fractions were recycled to the crystallization drum. In order to achieve the desired amount of seed material, about 3,000 kilos/h, there was recycled through the mill also a part of the fraction between 10 and 20 millimeters, namely about 1,300 kilos/h. As the final product having a grain size between 10 and 20 millimeters there was obtained about 6,300 kilos/h having a content of $Al_2O_3$ of 16.3%.

EXAMPLE 3

In a similar plant the crystallization drum had a length of 6.6 meters exclusive of the discharge chamber, a diameter of 2.8 meters and a rotational speed of 12 rpm. An aluminium sulphate solution having a concentration of 16.4% by weight of $Al_2O_3$ and a temperature of 112° C. was added to the crystallization drum in an amount of about 18,500 kilos/h through a pipe having five openings, the first of which was located 1.5 meters from the inlet opening of the drum, while the last one was located 3 meters from the outlet opening of the drum. Through the outlet opening of the drum air of 25° C. and in an amount of 22,300 $Nm^3/h$ was passed. In the bed a temperature of between 80° and 85° C. was maintained. The average residence time of the material in the drum was 25 minutes.

Furthermore, there was continuously added to the drum an amount of seed material of about 25,000 kilos/h, which material had a temperature of 45° C. From the drum an amount of material of about 43,000 kilos/h was discharged. In the sieve the coarse screen had a mesh size of 2 millimeters. The coarse fraction which did not pass through the said screen was ground in the mill to a grain size of 95% less than 1.5 millimeters. The other screen for undersize grains had been replaced by a plate and no undersize grains were collected by the sieve. To obtain the desired amount of seed material also part of the final product was recycled to the mill and the crystallization drum. As the final product there was obtained about 18,000 kilos/h of product having a content of 17.2% $Al_2O_3$ and a grain size of 99.5% between 0.25 and 2.0 millimeters.

EXAMPLE 4

In a plant of the same kind as was described in Example 3, there was added to the crystallization drum an aluminium sulphate solution having a concentration of 16.5 percent by weight of $Al_2O_3$ and a temperature of 112° C. in an amount of about 16,500 kilos/h. Through the drum air of about 18° C. in an amount of 22,000 $Nm^3/h$ was passed. In the bed a temperature of 75° C. was maintained. The seed material amounted to about 30,000 kilos/h and had a grain size of 100% less than 10 millimeters and a temperature of 45° C.

In the sieve the coarse screen had a mesh size of 20 millimeters, while the fine screen had a mesh size of 8 millimeters. The amount which did not pass through the 20 millimeters screen and the amount which did not pass through the 8 millimeters screen were ground to a grain size of 100% below 2 millimeters and recycled in the crystallization drum. In order to obtain the desired quantity of seed material also part of the fraction 8–20 millimeters was recycled to the mill and the crystallization drum. As the final product about 16,000 kilos/h having a grain size between 8 and 20 millimeters and a content of $Al_2O_3$ of 17.0% was obtained.

EXAMPLE 5

In a plant of the same type as was disclosed in Example 3 the composition of the aluminium sulphate feed solution had been changed to 12.8% of $Al_2O_3$ and 4.4% of $Fe_2O_3$ and 3% of acid-insoluble material. When otherwise operating at the same conditions as in Example 3 a final product was obtained, which was of the same quantity and had the same grain size, but which had a content of $Al_2O_3$ of 13.5% and a content of $Fe_2O_3$ of 4.5%.

By the technique according to the present invention a crystalline aluminium sulphate product having a very characteristic appearance and outstanding properties is obtained: Thus, the grain size in a wide range can be controlled to be within a very narrow range, and the product does not contain any fine material that causes dusting. The crystal agglomerates have a characteristic appearance through the fact that they consist of essentially spherical grains provided with warty projections as is illustrated schematically in FIG. 2 in the accompanying drawing. Moreover, these grains have a high strength which means that they can be transported in any manner and conveyed by means of pneumatic devices without causing fine material and dusting derived therefrom.

What is claimed is:

1. A method of crystallizing a solution of aluminium sulphate, consisting essentially of:
    a. maintaining a bed of aluminium sulphate in a rotating drum, the length of which drum is considerably larger than its diameter,
    b. maintaining a temperature of 70°–95° C. in the said bed,
    c. applying to the said bed a solution of aluminium sulphate having a temperature of 105°–115° C. and a concentration of 14.5–16.8% by weight of $Al_2O_3$, to thereby crystallize aluminium sulphate from said solution onto said bed of crystalline aluminium sulphate, d. discharging crystalline aluminium sulphate product from said drum, e. grinding the coarser part of said discharged crystalline aluminium sulphate product, f. recycling crystalline aluminium sulphate product to the drum, in an amount of 40–200% by weight of the solution added to said drum, to maintain said bed, g. passing air having a temperature of less than about 50° C. through the said drum to remove moisture and heat evolved by crystallization of said solution on said bed in said drum, h. increasing the weight percentage of $Al_2O_3$ in the obtained product by 0.4 to 1.5% above that of the starting solution and i. air cooling to produce an aluminium sulphate product which has more than 75% of its weight present in the crystalline state and which contains about 15.0–18.0% by weight of $Al_2O_3$ in the form of granules of crystal agglomerates having an essentially uniform grain size, a characteristic appearance, and good storage properties, and j. recovering the said aluminium sulphate crystalline agglomerates from said cooling step.

2. A method according to claim 1 in which the crystalline product formed in the drum is discharged from the drum at such a rate that the residence time in the drum will be at least about five (5) minutes.

3. A method according to claim 1 in which the solution is applied onto a zone of the bed which extends over at most 95% of the length of the drum as measured from the inlet opening, the crystallization being completed in the drum without any addition of solution to the remaining part of the bed.

4. A method according to claim 1 in which the seed material is applied onto the bed at the desired location in the first half of the drum as measured from the inlet opening.

5. A method according to claim 1 in which the crystal mass discharged from the crystallization drum is conveyed to a cooling drum by means of an open conveyor so as to prevent aggregation of the product.

6. A method according to claim 1 in which the external wall of the crystallization drum is exposed to a mild cooling by surrounding air, whereby sticking of material to the inside of the drum is avoided or at least reduced.

7. A method according to claim 1 in which scraping the inside of the crystallization drum creates a thin layer of aluminium sulphate on the inner wall of the drum thereby eliminating deviation from a circular shape.

8. A method according to claim 1 in which the crystallization drum is rotated at a speed which is close to that at which the material therein is conveyed around.

9. A method according to claim 1 in which an aluminium sulphate solution which contains more than 16.8% by weight of $Al_2O_3$ is added to the crystallization drum with a simultaneous and separate addition of water or steam so as to compensate for this higher concentration.

10. A method according to claim 1 in which the concentration of $Al_2O_3$ in an aluminium sulphate solution of technical grade and containing impurities is adjusted in such a way with reference to the content of impurities that the amount of water available in the solution will give a product having more than 75% by weight of the aluminium sulphate in the crystalline state.

11. A method according to claim 1, wherein the temperature of the air in step (g) is about 18° to 25° C.

12. A method according to claim 1, in which the removal of moisture and heat in step (g) is at a temperature below +60° C.

* * * * *

UNITED STATES PATENT AND TRADEMARK OFFICE
CERTIFICATE OF CORRECTION

PATENT NO. : 4,276,052

DATED : June 30, 1981

INVENTOR(S) : Egon Boisen Schmidt, Josef K. S. Zechner and Gösta M. Frang

It is certified that error appears in the above—identified patent and that said Letters Patent is hereby corrected as shown below:

[56] References Cited, U.S. PATENT DOCUMENTS, line 4; "Brooksbank" should read -- Brooksbank, et al. --  Copy of the original Letters Patent No. 3,082,064.

Col. 3, line 13; "110° - 115°C.," should read -- 100° - 115°C., --

Col. 3, line 54; "aircoooled" should read -- air-cooled --

Signed and Sealed this

Second Day of February 1982

|SEAL|

Attest:

GERALD J. MOSSINGHOFF

Attesting Officer

Commissioner of Patents and Trademarks